Jan. 19, 1960 N. S. DEMBINSKI 2,921,691
CAKE SUPPORTING STRUCTURE
Filed Aug. 8, 1958 3 Sheets-Sheet 1

INVENTOR.
NICK S. DEMBINSKI
BY
*M. A. Hobbs*
ATTORNEY

Jan. 19, 1960   N. S. DEMBINSKI   2,921,691
CAKE SUPPORTING STRUCTURE
Filed Aug. 8, 1958   3 Sheets-Sheet 2

INVENTOR.
NICK S. DEMBINSKI
BY M. A. Hobbs
ATTORNEY

INVENTOR.
NICK S. DEMBINSKI
ATTORNEY

United States Patent Office 2,921,691
Patented Jan. 19, 1960

2,921,691

CAKE SUPPORTING STRUCTURE

Nicholas S. Dembinski, South Bend, Ind.

Application August 8, 1958, Serial No. 753,913

7 Claims. (Cl. 211—134)

The present invention relates to a supporting structure for cakes, and more particularly to a structure for supporting individually and spacing the layers of multiple layer cakes.

One of the principal objects of the present invention is to provide a support structure for the layers of a multiple layer cake, which holds the layers in spaced relation without placing the supporting pressure of one layer on any other layer of the cake.

Another object of the invention is to provide a supporting structure for the layers of a cake, which can be readily assembled and disassembled and adapted to various sizes and numbers of cake layers.

Still another object is to provide a relatively simple and attractive cake layer support and spacer which is sturdy in construction and gives firm support to the successive layers of the cake and which can easily be cleansed, packaged and stored.

A further object of the invention is to provide support for successive layers of a cake which permits each layer to be removed from the layer cake and served as a separate cake.

Additional objects and advantages of the present invention will become apparent from the following description and accompanying drawings, wherein.

Figure 1:
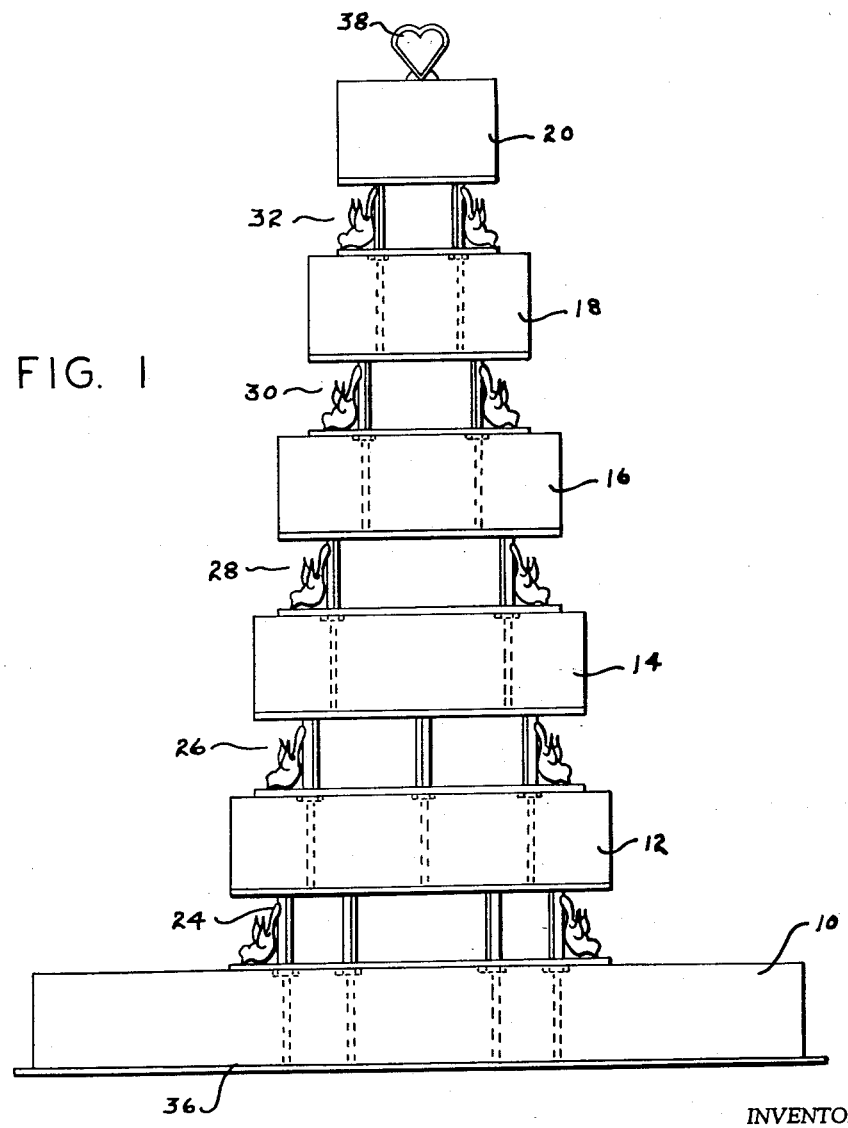
Figure 1 is an elevational view of a layer cake in which my layer supporting and spacing devices are used.
Figure 3:
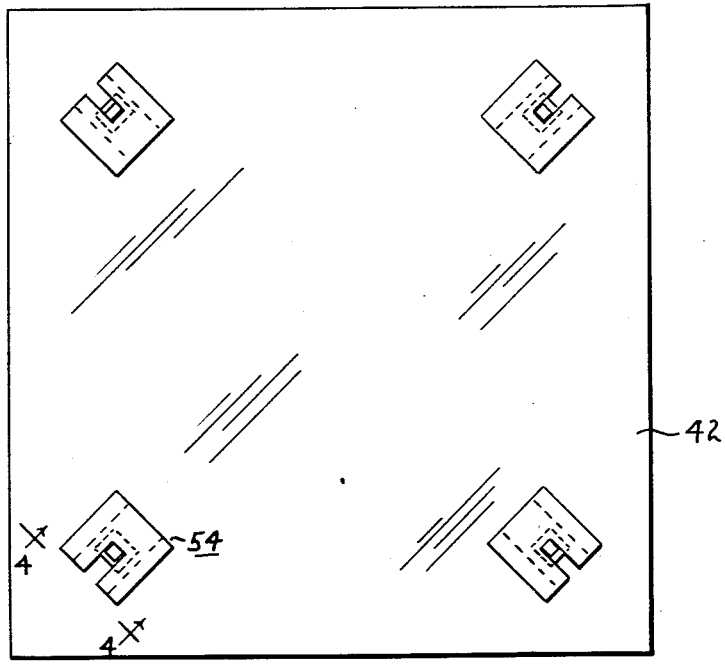
Figure 3 is a bottom view of the cake layer supporting and spacing device shown in Figure 2.
Figure 2:
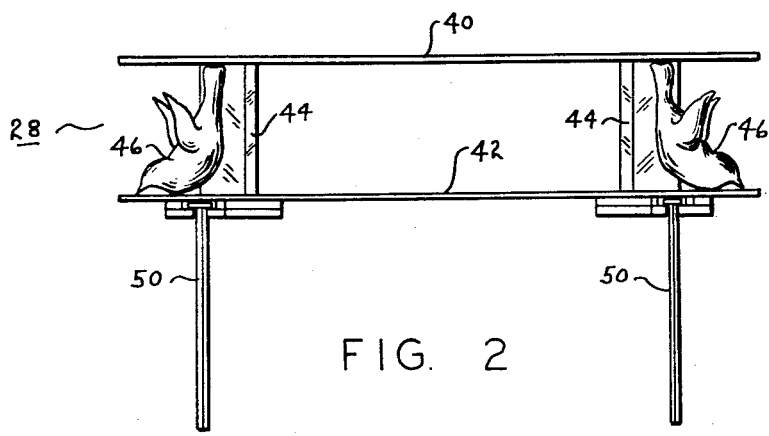
Figure 2 is a side elevational view of one of my cake layer supporting and spacing devices removed from the cake.
Figures 4, 5:
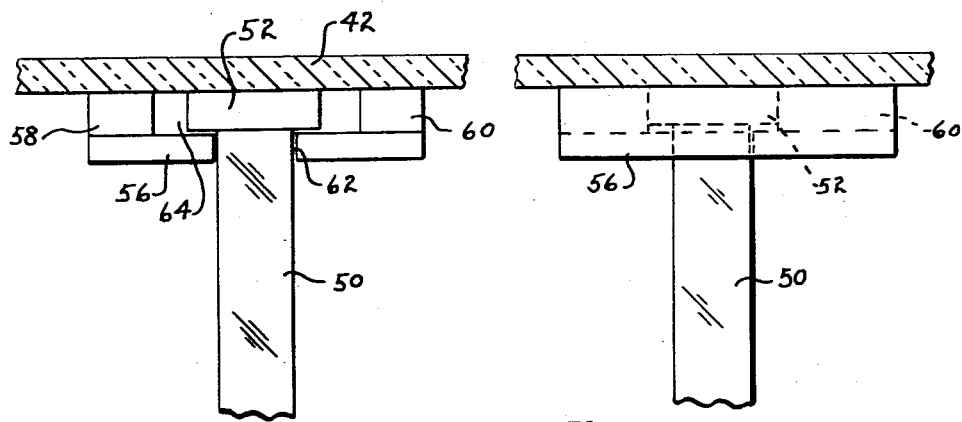
Figure 4 is an enlarged fragmentary elevational view of the supporting structure of the device shown in the preceding figures, taken on line 4—4 of Figure 3.
Figure 5 is a side elevational view of the same supporting structure shown in Figure 4.
Figure 7:
Figure 7 is an elevational view of one of the posts forming a part of the supporting structure.
Figure 6:
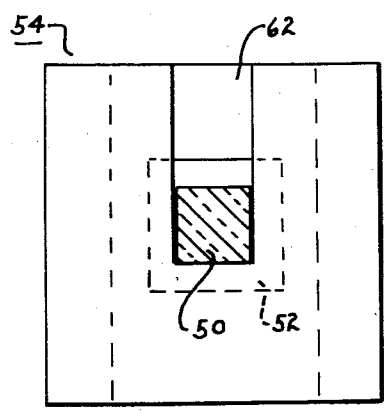
Figure 6 is a bottom view of the supporting structure shown in Figures 4 and 5.
Figure 8:
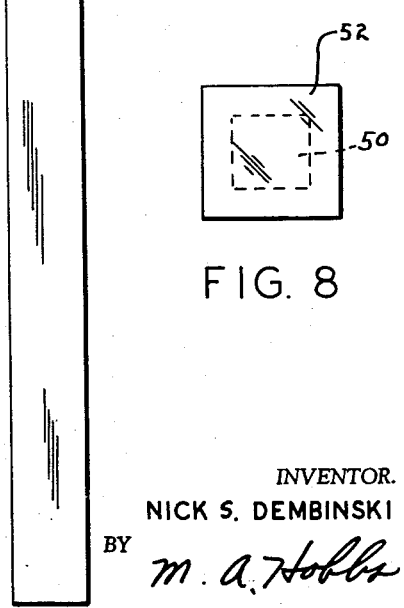
Figure 8 is a top plan view of the post shown in Figure 7.

Referring more specifically to the drawings, particularly Figure 1 wherein a multiple layer cake is illustrated, numerals 10, 12, 14, 16, 18, and 20 designate successive layers of the cake decreasing in size from the bottom layer 10 to the top layer 20, and numerals 24, 26, 28, 30 and 32 designate graduated sizes of my layer supporting and spacing device, the lower layer 10 of the cake resting on a plate 36 and the top layer 20 supporting an ornamental figure suitable for the occasion, the one shown being a heart shaped figure 38.

All of the layer supporting and spacing devices are substantially the same in construction and appearance, hence only one of the devices will be described in detail. The device 28 consists of two square rigid plates 40 and 42 held in spaced relation by four post-like members 44 joined at their ends to the plates near the corners thereof. The plates and spacer members are preferably constructed of a rigid plastic material and the posts joined to the plates by a suitable cement, such that the structure formed thereby constitutes a rigid unit of two parallel plates and three, four or more spacer members secured firmly to the plates. The plates of any one unit are preferably the same size and are normally the size and shape of the cake layer supported thereby. Ornamental figures may be placed on and secured to the upper surface of plate 42 and, in those shown, doves 46 are placed on the lower plate between posts 44 and the respective corner of the plate. Other types of figures may be mounted between the plates and they may be placed at various places and positions thereon.

In order to avoid placing pressure of one layer on the layers beneath it, each device is provided with four or more legs 50 removably attached to the lower side of plate 42 near the corners thereof and adapted to extend downwardly through layer immediately below and rest on the top of plate 40 of the device supporting the latter layer or, if the device is in the lowest position in the cake, to rest on plate 36. The legs shown in the drawings are square in cross section and have a square cap 52 somewhat larger than the legs secured to the upper end. The leg is joined to the under side of plate 42 by a fixture 54 consisting of a plate 56 connected at opposed edges to the plate by side members 58 and 60 and having a slot 62 paralleling said side members and extending from one edge to a little beyond the center. The space between side members 58 and 60, being larger than slot 62, forms an under-cut groove 64 for receiving cap 52 and the upper end of leg 50, the legs being retained in an upright position by the relatively close fit of the cap in the groove and the upper end of the leg in slot 62. The flat lower surface of plate 42 seats on the flat upper surface of the cap thereby assisting in retaining the legs firmly in an upright position while the device is being used to support the layers of a cake.

To assemble the posts in fixtures 54, the cap and upper end of the legs are merely slipped into groove 64 and slot 62, respectively, and the unit is ready for use. The legs are disassembled by simply slipping the cap and leg from the groove and slot. It is thus seen that the unit can be readily assembled, used, and thereafter easily disassembled for cleaning and storage. The cap and leg remain in the fixture while assembled in position in a cake without likelihood of being accidentally removed, and as a particular layer is lifted from the cake the legs can readily be removed so that the unit containing the layer will rest firmly on a table or other flat supporting surface.

While in the present illustration of the present invention plates 40 and 42 have been described as being square in shape, they may be other rectangular shapes, and may be round, oval or some specially designed shape. The material used in constructing the various parts of the device is preferably plastic, either white, colored or transparent; however, other material such as aluminum, steel or wood may be used if desired. Other changes and modifications may be made without departing from the scope of the invention.

I claim:

1. A cake layer supporting and spacing device, comprising upper and lower flat, square plates of plastic material, four posts of equal length positioned between said plates near the corners thereof and joined at their ends to said plates forming a rigid structure with said plates parallel to one another, ornaments mounted between said plates at the corners thereof and secured to one of said plates, four legs of equal length for said structure, a cap on the upper end of each leg, fixtures for removably attaching the legs to the structure mounted thereon near the corners of the lower plate, said fixtures including a flat member spaced from said lower plate, side walls connecting said member with said lower plate, a longitudinal groove therein with a closed end and an open end, said open end facing the corner of said plate, for receiving said cap and the upper end of the leg.

2. A cake layer supporting and spacing device, comprising upper and lower square plates of plastic material, four posts of equal length positioned between said plates near the corners thereof and joined at their ends to said plates forming a rigid structure with said plates parallel to one another, four legs of equal length for said structure, a cap on the upper end of each leg, fixtures for removably attaching the legs to the structure mounted thereon near the corners of the lower plate, said fixtures including a flat member spaced from said lower plate, side walls connecting said member with said lower plate, and a longitudinal groove therein with a closed end and an open end, said open end facing the corner of said plate for receiving said cap and the upper end of the leg.

3. A cake layer supporting and spacing device, comprising upper and lower rectangular plates, four posts of equal length positioned between said plates and joined at their ends to said plates forming a rigid structure with said plates parallel to one another, four legs of equal length for said structure, a cap on one end of each leg, fixtures for removably attaching the legs to the structure, said fixtures including a member having side walls attached to said lower plate, and a groove therein with a closed end and an open end, said open end facing the corner of said plate for receiving said cap and the upper end of the leg.

4. A cake layer supporting and spacing device, comprising upper and lower rectangular plates, a plurality of posts positioned between said plates and joined at their ends to said plates forming a rigid structure with said plates parallel to one another, a plurality of legs for said structure, a cap on one end of each leg, fixtures for removably attaching the legs to the structure, said fixtures including a member having side walls attached to said lower plate, and a groove therein with a closed end and an open end for receiving said cap and the upper end of the leg.

5. A cake layer supporting and spacing device, comprising upper and lower plates, a plurality of posts positioned between said plates and joined at their ends to said plates forming a rigid structure with said plates parallel to one another, a plurality of legs for said structure, a cap on one end of each leg, fixtures for removably attaching the legs to the structure, said fixtures including a member having side walls attached to said lower plate, and a groove therein with a closed end and an open end for receiving said cap and the upper end of the leg.

6. A cake layer supporting and spacing device, comprising upper and lower plates, a plurality of posts positioned between said plates and joined at their ends to said plates forming a rigid structure with said plates parallel to one another, and a plurality of legs removably attached to the underside of said lower plate.

7. A cake layer supporting and spacing device, comprising upper and lower rectangular plates, four posts positioned between said plates and joined at their ends to said plates forming a rigid structure with said plates parallel to one another, and four legs removably attached to the underside of said lower plate near the corners thereof.

References Cited in the file of this patent

UNITED STATES PATENTS

| | | |
|---|---|---|
| 1,337,012 | Goodwin | Apr. 13, 1920 |
| 2,178,166 | Enstrom | Oct. 31, 1939 |
| 2,639,956 | Jacobson | May 26, 1953 |